Patented Mar. 28, 1933

1,903,126

UNITED STATES PATENT OFFICE

ROY C. NEWTON AND DONALD P. GRETTIE, OF CHICAGO, ILLINOIS, ASSIGNORS TO SWIFT AND COMPANY, OF CHICAGO, ILLINOIS, A CORPORATION OF ILLINOIS

ANTIOXIDANT FOR FATS AND OILS

No Drawing.    Application filed April 11, 1932. Serial No. 604,649.

This invention relates to a novel and improved process for stabilizing oils and fats and more particularly, for stabilizing edible oils and fats, whereby the oils and fats are stable not only during storage and distribution in the package, but also when used in the manufacture of crackers and other bakery or similar products.

This invention also relates to the stabilized oils and fats produced in accordance with the process of this invention and to the improved bakery products containing such oils and fats.

In the manufacture of shortening materials, oils and fats are compounded to produce a mixture possessing the various desirable properties for commercial use, and the components used in such mixtures are selected as to kind and proportion according to the properties desired in the finished compound or shortening material. In order to produce compounds possessing the various desirable properties, it is necessary at times, to use oils and fats which do not possess naturally, maximum stability against atmospheric oxidation. It is with special reference to this type of shortening product that the present invention concerns itself.

Fats and oils of commerce are subject to deterioration in quality due to oxidation. Many bakery products in which shortening, containing oils and fats, is used, are kept for considerable periods before they are ultimately consumed. This is due to the time required in storage and distribution in accordance with usual marketing practices. The oils and fats used in this type of product are subject to the action of oxygen over a very large surface inasmuch as the finished bakery products are usually dry and somewhat granular or flaky. During the period of distribution which often includes storage, as well as transportation, there has been in the past, considerable loss from staleness or more advanced degrees of rancidity.

The edible oils and fats on deterioration become non-edible and must be used for non-edible purposes, while edible, fat-containing products likewise become non-edible on deterioration of the fat constituent. In the manufacture of crackers, or other bakery products, where fats are used and where the products are kept for considerable periods of time, there is a very substantial hazard and frequently great loss due to this oxidation or rancidity of the fat contained in such products.

Accordingly, it is an important object of this invention to overcome this loss and to provide a method for stabilizing oils and fats and to provide stable shortening products resistant to oxidation under the above stated conditions.

This application relates to an invention constituting an additional discovery and an advancement over the disclosure of applicants' co-pending application Serial No. 536,942, filed May 12, 1931, entitled "Stabilization of oils and fats." In accordance with the disclosure of said co-pending application, it has been found to be possible to stabilize oils and fats not only in the package during distribution, but also in the food products, such as bakery products in which the oils and fats are used, by incorporating in the oils and fats a small amount of stabilizing agent.

Furthermore, it has been proposed, prior to the invention of said co-pending application, to increase the stability of oils and fats while in storage and in the package by incorporating small amounts of phenols therein, which treatment, however, is known to be effective for stabilizing oils and fats when the shortening is mixed with other ingredients containing moisture. This is attributable to the fact that such phenols are more or less soluble in water and therefore, when mixed with other ingredients containing moisture, they are extracted from the oils or fats and are thereby prevented from performing their intended stabilizing function. This failure of the stabilizing agent is particularly true if and when the other ingredients are alkaline or contain alkaline constituents. Thus pyrogallol and pyrocatechin which are mentioned in the co-pending application, when added in small amounts to lard, will improve the keeping quality of pure lard to a very considerable extent but will have little or no effect in stabilizing lard and retarding rancidity when incorporated in pie crusts or other products containing moisture or requiring the use of moisture in their manufacture.

Said co-pending application is directed toward the discovery of certain phenol derivatives and condensation products which are substantially insoluble in water but are soluble in the particular oils or fats to be stabilized and whereas said invention is generic in character, the present invention relates to the discovery that a highly improved stabilizing action is provided by incorporating in the oils and fats, a natural resinous material coming from the wood of Guajacum officinale Linné of Guajacum sanctum Linné family Zygophyllaceæ, commonly known as "gum guaiac".

Although the exact chemical nature of this material is unknown and its active principles in serving as an improved stabilizer for oils or fats are for the most part undeterminable, gum guaiac is generally supposed to be a mixture of acids which are condensation products of tiglic aldehyde and guaiacol. Similarly, guaiacol, though relatively complex, is usually considered to be the methyl ether of pyrocatechin. Although the applicants do not wish to be limited to these statements of chemistry, this information is given as the recognized belief and to show that guaiac gum should be properly considered as a condensation product of a methyl ether of a polyhydric phenol and therefore is a phenol derivative or more strictly, a condensation product of a phenol derivative, as claimed in said co-pending application.

Gum guaiac is readily soluble in oils and fats to the extent needed for materially improving their keeping qualities. For practical use in an edible product, the anti-oxidant or stabilizing agent added to the lard or other edible oil or fat should be non-toxic and should be of such a nature that it will be eliminated properly when taken internally as a constituent of food. Phenols are widely distributed in nature, and occur in many natural food products in small quantities; and the physiological mechanism of handling small quantities of phenols is well known. The water insolubility of the gum guaiac employed in the present invention is an aid to its being discarded and eliminated since water insolubility limits the amount absorbed from the digestive tract.

Furthermore, gum guaiac is substantially odorless, colorless and tasteless and therefore may be used without being detected in the final product.

In general, it is contemplated in practicing the present invention, to add about 0.1 per cent of gum guaiac to the oils or fats, although a greater amount can be used if the oil or fat is of a very poor quality. It has been found that gum guaiac is effective to a certain extent as a stabilizer in amounts as low as .001 per cent to .01 per cent.

It is contemplated to add gum guaiac to the oil or fat while existing as a completely melted liquid prior to packaging. If the oil or fat is to be refined with caustic or otherwise treated as for hydrogenation and/or deodorization, it is more advantageous to add the gum guaiac after these processes have been completed.

It is also contemplated to add gum guaiac in substantially the proportions specified, directly to bakery mixtures, in which case, the amount will be calculated on the amount of oil or fat contained in the mixture.

We claim:

1. The process of stabilizing oils and/or fats which comprises incorporating therein a small amount of natural resin, gum guaiac.

2. The process of stabilizing oils and/or fats which comprises incorporating therein gum guaiac in quantity of substantially 0.1% or less.

3. The process of stabilizing oils and/or fats which comprises incorporating therein .05% gum guaiac.

4. The process of stabilizing bakery products containing oils and/or fats which comprises incorporating in the oils and/or fats before mixing with the other ingredients, a small amount of the natural resin, gum guaiac.

5. The process of stabilizing bakery products containing oils and/or fats which comprises incorporating in the oils and/or fats before mixing with the other ingredients, gum guaiac in quantity of substantially 0.1% or less.

6. The process of stabilizing bakery products containing oils and/or fats which comprises incorporating in the oils and/or fats before mixing with the other ingredients, .05% of gum guaiac.

7. The process of stabilizing bakery products containing oils and/or fats which comprises incorporating therein a small amount of natural resin, gum guaiac.

8. The process of stabilizing food products containing oils and/or fats which comprises incorporating therein a small amount of natural resin, gum guaiac.

9. An improved stabilized oil and/or fat containing a small amount of natural resin, gum guaiac.

10. An improved stabilized oil and/or fat containing gum guaiac in quantity substantially one-tenth of one per cent or less.

11. An improved stabilized oil and/or fat containing five-hundredths of one per cent gum guaiac.

12. An improved stabilized bakery product containing oils and/or fats having a small amount of the natural resin, gum guaiac, in said oils and/or fats.

13. An improved stabilized bakery product containing oils and/or fats having in said oils and/or fats, gum guaiac in quantity of substantially one-tenth of one per cent or less.

14. An improved stabilized bakery product containing oils and/or fats, having in said oils and/or fats five-hundredths of one per cent of gum guaiac.

15. An improved stabilized bakery product containing oils and/or fats and a small amount of natural resin, gum guaiac.

16. An improved stabilized food product containing oils and/or fats and a small amount of natural resin, gum guaiac.

Signed at Chicago, in the county of Cook and State of Illinois, this 9th day of April, 1932.

ROY C. NEWTON.
DONALD P. GRETTIE.